April 23, 1968 W. SIECKMAN 3,379,238
POLYPHASE ELECTRIC FURNACE FOR MOLDING INGOTS
Filed May 26, 1965 2 Sheets-Sheet 1

INVENTOR.
Walter Sieckman
BY Fred Wimmett
Attorney

April 23, 1968
W. SIECKMAN
3,379,238
POLYPHASE ELECTRIC FURNACE FOR MOLDING INGOTS
Filed May 26, 1965
2 Sheets-Sheet 2
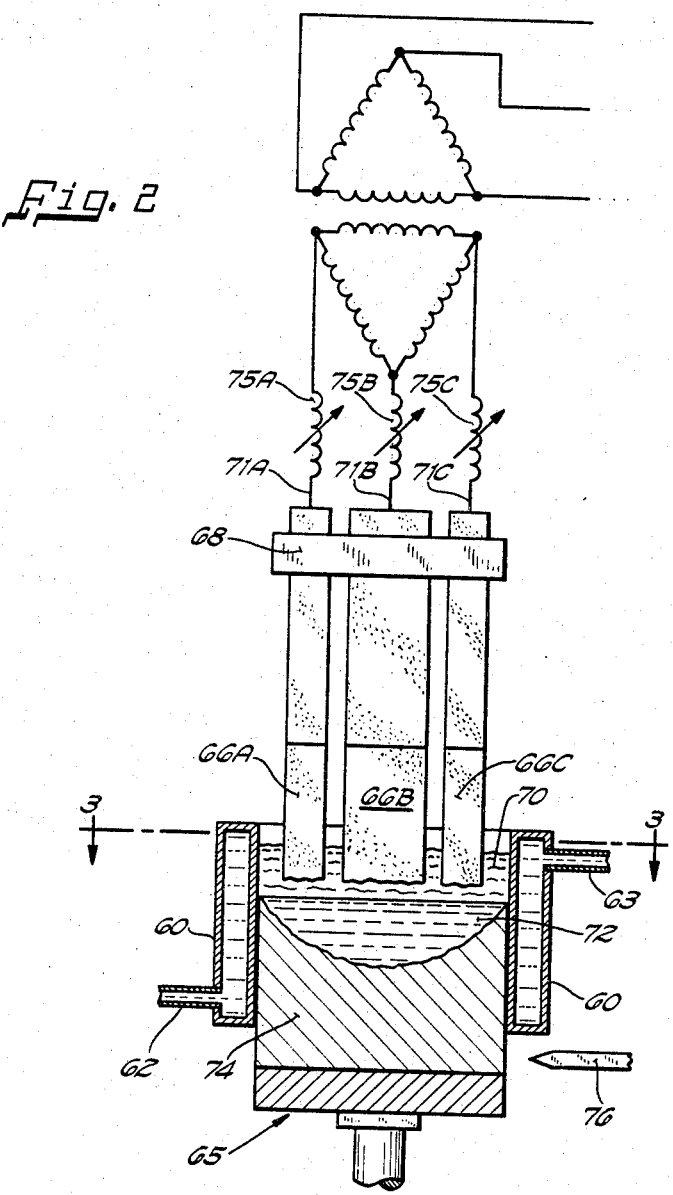
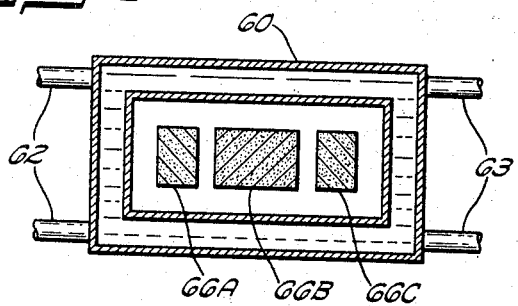
INVENTOR.
Walter Sieckman
BY
Fred Wiviott
Attorney United States Patent Office 3,379,238
Patented Apr. 23, 1968

3,379,238
POLYPHASE ELECTRIC FURNACE FOR
MOLDING INGOTS
Walter Sieckman, Canonsburg, Pa., assignor, by mesne
assignments, to Lectromelt Corporation, Pittsburgh,
Pa., a corporation of Delaware
Filed May 26, 1965, Ser. No. 458,977
2 Claims. (Cl. 164—252)

ABSTRACT OF THE DISCLOSURE

A three-phase electric furnace having three electrodes arranged in a single row within an open top mold and presenting horizontally aligned lower ends spaced above an ingot as already formed in the mold and disposed beneath a slag blanket over the ingot, the end electrodes being of similar cross sections and each generally one half of the cross section of the center electrode.

---

Figure 1:
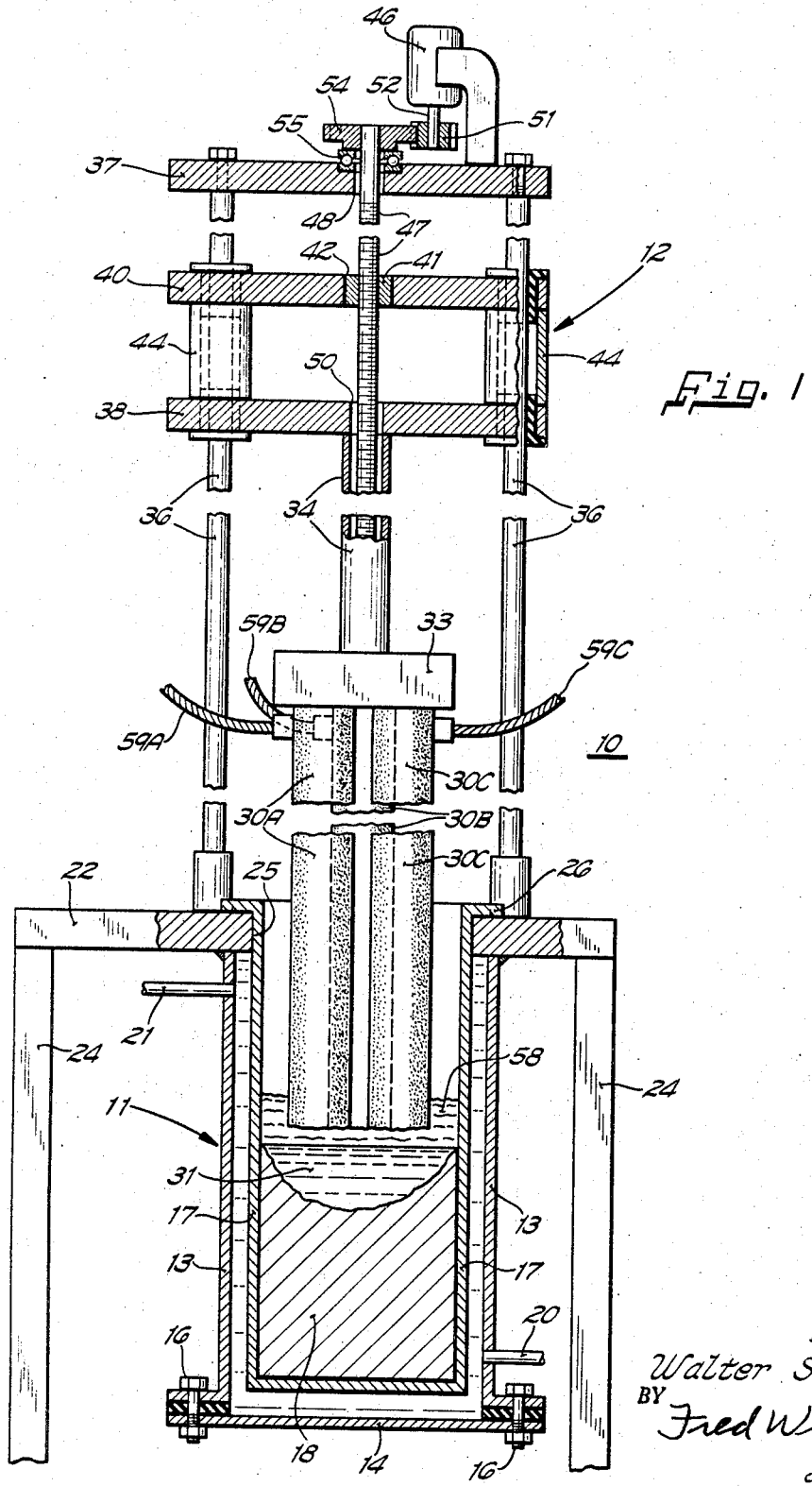

This invention relates to polyphase electric furnaces and, more particularly, to a polyphase consumable electrode electric furnace and a method for producing high quality ingots therein.

In one prior art method for molding a high quality ingot, a consumable electrode having substantially the same constituency as the ingot to be molded, is melted beneath a slag blanket. Relatively large direct currents are supplied to the electrode and flow between its lower end and the molten metallic pool to produce the necessary heat of fusion and the mold is cooled to provide progressive solidification of the molten metal. It has been found that an ingot having more desirable mechanical properties and surface appearance can be obtained when the lower end of the electrode and the pool of molten metal is protected from atmospheric contamination by a slag blanket.

In such prior art furnaces, wherein relatively large direct currents were employed to melt consumable electrodes under a slag blanket, it was found necessary to rotate the mold in order to prevent the formation of undesirable segregational patterns and grain structures during solidification. This required the use of complex structures for rotating the mold and for transferring current between the rotating mold and the stationary support structure. Also, as a result of such rotation, only ingots having a circular cross section could be molded and in addition the length of the ingot was limited to that of the mold thereby preventing continuous operation.

Another disadvantage of prior art furnaces of this type was the need for relatively expensive rectification equipment for converting readily available alternating current power to the required direct current. Also, the size of ingots that could be produced in prior art direct current slag melting furnaces was limited as the result of heat transfer limitations from a single concentrated heat source.

It is an object of the invention to provide a new and improved furnace for the more rapid melting of consumable electrodes under a slag blanket and which is capable of producing ingots of superior quality.

Another object of the invention is to provide a polyphase furnace for melting consumable electrodes beneath a slag blanket.

A further object of the invention is to provide a furnace for melting consumable electrodes beneath a slag blanket wherein relatively large ingots may be produced.

Yet another object of the invention is to provide such a furnace which is capable of producing ingots which are polygonal in cross-section.

A still further object of the invention is to provide a consumable electrode slag melting furnace wherein mold rotation is not required.

Yet another object of the invention is to provide a consumable electrode slag melting furnace capable of continuous operation.

It is another object of the invention to provide a new and improved method for molding metal ingots.

These and other objects and advantages of the instant invention will become more apparent from the detailed description thereof taken with the accompanying drawings in which:

FIG. 1 is a side elevational view, partly in section, of one embodiment of the instant invention;

FIG. 2 schematically illustrates an alternate embodiment of the instant invention; and FIG. 3 is a view taken along lines 3—3 of FIG. 2.

In general terms, the invention comprises a polyphase consumable electrode electric melting furnace having a stationary, cooled ingot mold, an electrode associated with each phase, polyphase circuit means connected to each electrode for supplying phase current thereto, means for moving the electrodes relative to the ingot mold, and a slag blanket covering the lower end of each of said electrodes and the molten pool metal within the ingot mold.

According to another one of its aspects, the invention comprises a method of molding an ingot comprising the steps of providing a cooled ingot mold and a plurality of electrodes movable relative to said mold, energizing each electrode with one phase of a polyphase electric current to progressively melt the electrodes and to form a pool of molten metal within the ingot, and covering the surface of the molten metal with a slag blanket.

Referring now to the drawings in greater detail, FIG. 1 shows a three-phase consumable electrode melting furnace designated generally by the reference numeral 10 and including a mold section 11 and an electrode drive assembly 12.

The mold section 11 includes an outer substantially cylindrical shell 13 having a bottom closure member 14 which is affixed thereto in a hermetically sealed relation by means of bolts 16 to provide a cooling jacket for the mold 17 disposed therewithin and which receives the ingot 18 formed from the metal being melted. The shell 13 is provided with a cooling fluid inlet pipe 20 and an outlet pipe 21. A horizontal mounting plate 22 is supported by vertical columns 24 and has a central aperture 25 for receiving the upper end of the mold 17. A flange 26 extends outwardly from the upper end of the mold 17 and is suitably affixed to the upper surface of the mounting plate 22. It will be understood that while the mold 17 is stationary during a melting operation, it may be removable so that after the ingot 18 has been formed another mold may be put in its place for a subsequent melting operation while the first ingot is cooling and being removed from the mold.

The electrode drive assembly 12 supports three electrodes 30A, 30B and 30C within the mold 17 and positions the lower ends thereof relative to the molten pool 31 formed at the upper end of the ingot 18. The electrodes 30A, 30B and 30C are carried by a common crosshead 33 which in turn is carried at the lower end of a hollow electrode ram 34.

The electrode drive assembly 12 is supported above the support plate 22 by a plurality of vertically extending rods 36 whose lower ends are affixed to the plate 22 and whose upper ends support a top plate 37. In addition, a first plate 38 is affixed to the upper end of the electrode ram 34 and a second plate 40 is disposed vertically above plate 38. A nut 41 is affixed in an aperture 42 formed in the plate 40 coaxially with the electrode ram 34. A tubular member 44 is slidably disposed on each of the support rods 36 and each is affixed at its lower end to the first plate 38 and at its upper end to the second plate 40 so that the plates 38 and 40 are coupled for sliding vertical movement on the support rods 36.

The electrode drive assembly 13 also includes a motor 46 suitably mounted above the top plate 66 and a drive screw shaft 47 which threadably engages the fixed nut 41 in the second plate 40 and extends vertically downward through apertures 48 and 50 in the plates 37 and 38 respectively and into the hollow interior of the electrode ram 34. A pinion 51 is carried on the output shaft 52 of the motor 46 and engages a gear 54 affixed to the upper end of the screw shaft 47 and is rotatably mounted about the aperture 48 in plate 37 by a suitable bearing assembly 55.

Three-phase electrical energy is supplied to the electrodes 30A, 30B and 30C by conductors 59A, 59B and 59C, respectively. As will be appreciated by those skilled in the art, the crosshead 33 suitably insulates the upper ends of the electrodes 30A, 30B and 30C.

A slag blanket 58 covers the lower ends of the electrodes 30A, 30B and 30C and the molten pool 31 at the upper end of the ingot 18. The composition of the slag blanket 58 is the same as that employed in single-phase slag melting furnaces and is well known in the art.

Each of the electrodes 30A, 30B and 30C consists of a fusion formed ingot having substantially the desired metal alloy content for the cast ingot body to be formed. However, because of their structure or undesirable inclusions these electrodes do not have the quality necessary for the final product.

As seen in FIG. 1, the slag blanket 58 covers the molten pool 31 and the lower end of the electrodes which are spaced a short distance above said pool. The three-phase alternating current supplied by the conductors 57A, 57B and 57C flows between the lower ends of the electrodes 30A, 30B and 30C and through the slag blanket 58. The resulting heat fuses the metal at the lower ends of said electrodes which then collects in the molten metal pool 31 to be progressively cooled by the cooling fluid supplied through the pipes 20 and 21.

As the electrodes melt and the particles of molten metal pass through the slag blanket, various impurities in the electrodes pass into the slag. In addition, the slag blanket 58 tends to prevent contamination of the molten pool 18 from the atmosphere and dissipation of the heat from the molten pool 31 into the atmosphere through the upper end of the mold 17. As the electrodes 30A, 30B and 30C fuse the motor 46 rotates to move the crosshead 33 slowly downward so that the desired spacing between the lower ends of the electrodes in the molten pool 31 will be maintained. Control apparatus for the motor 46 are well known in the art and will not be described herein for the sake of brevity.

It has been found that the ingot size in a single-phase D.C. consumable electrode melting furnace is limited to about twenty inches in diameter for metals prone to segregation. The occurrence of such segregations of alloying elements tends to be directly related to the depth of the molten pool which to a large extent controlled by its temperature and the heat transfer rate between the core of the ingot and the mold wall. Since the solidification rate in inches is a function of the square root of the solidification time in minutes, an increase in ingot diameter increases the solidification time to provide a deeper pool of molten metal which, in turn, requires retardation of the melt rate. In addition, the relatively large direct currents cause the formation of a superheated area, called an anode spot, in the molten pool beneath the electrode which contributes to the deepening of the molten pool. Deepening of the molten pool tends to increase undesirable segregation patterns.

Because the three-phase current in the electrodes 30A, 30B and 30C alternates, a relatively hot anode spot will not appear in the molten pool beneath the electrodes as in the case of single-phase D.C. furnaces. As a result, it is possible to achieve a shallower pool of molten metal 31 which enhances progressive uniform solidification so that the ingot will have the desired grain structure and surface properties and be relatively segregation free. In addition, because three electrodes are employed, the heat in the ingot is less concentrated whereby a shallower molten pool is achieved in spite of a faster melt rate so that larger ingots may be formed.

In prior art direct current consumable electrode slag melting furnaces, it has been found that stray magnetic fields produce a unidirectional stirring effect on the molten pool which tends to produce undesirable grain structures. However, because the three-phase current supplied to the electrodes 30A, 30B and 30C is alternating, it is not necessary to provide a rotating mold or electromagnetic stirring coils in order to cancel this adverse unidirectional stirring effect.

FIGS. 2 and 3 show an alternate embodiment of the instant invention which is particularly adapted for the molding of elongate rectangular-in-section slab ingots and which is also capable of continuous operation. In this embodiment the mold 60 is shown to comprise a double-walled, open-ended member which is generally rectangular in the plan view shown in FIG. 3. Cooling fluid is supplied to the member 60 through inlet pipes 62 and outlet pipes 63. The lower end of the mold 60 is initially closed by a retractable mold cap and ram 65. Each of the electrodes 66A, 66B and 66C are generally rectangular-in-cross-section and are suspended in a vertical row from a common crosshead 68.

As stated hereinabove, the retractable mold cap and ram 65 initially closes the lower end of the mold 60, and the electrodes 66A, 66B and 66C are lowered into close proximity therewith at which point the cap and ram 65 are covered with a slag blanket 70. The electrodes 66A, 66B and 66C are then energized with three-phase alternating current through conductors 71A, 71B and 71C, respectively, so that a pool of molten metal 72 begins to form within the mold 60 as the heat generated by the alternating current flow causes fusion at the lower end of the electrodes. As the ingot 74 begins to solidify the mold cap and ram 65 is slowly withdrawn from the lower end of the mold 60 to form an elongate slab having a cross sectional area equal to the internal cross sectional area of the mold 60.

In order to permit continuous operation, new electrode sections are attached in any suitable manner, such as by welding, to the upper ends of the old sections as they are consumed. After the new electrode sections are attached, the common crosshead 61 is raised to a new position at the upper end of the new electrode sections in a manner well known in the art.

As seen in FIG. 3, it is preferable that the centermost electrode 66B have substantially twice the cross sectional area as the outer two electrodes 66A and 66C. This is advantageous because of unbalanced electrical conditions in the electrodes as a result of mutual induction therebetween and also because of unbalanced heat transfer between the electrodes themselves and between the electrodes and the walls of the mold 60. Thus, if the center electrode 66B were the same size as the other electrodes it would not only receive more radiated heat than the outer electrodes but it would also be exposed to a smaller area of the cooled mold 60. In addition, variable inductors 75A, 75B and 75C are connected in series with the electrodes 71A, 71B and 71C, respectively, in order to neutralize the unbalanced mutual inductance inherent when electrodes are aligned in the manner shown. This plus the heat transfer balance that is achieved by enlarging the central electrode permits balanced electrode melting so that the electrodes 30A, 30B and 30C may be fed simultaneously by the common crosshead 68.

It can be seen that the three-phase slag melting furnace according to the instant invention allows the formation of a slag ingot which is both elongate and rectangular-incross-section. This would not be possible in a D.C. furnace which requires mold rotation.

Shear means 76, which is only schematically illustrated, but which is well known in the art, is provided for cutting the ingot 76 after it has reached the desired length. Because of the fine surface qualities achieved in the slag melting furnace, the slab ingot 74 may be directly rolled without the in-process surface conditioning and reheating required with slab ingots produced by prior art methods.

While only a few embodiments of the instant invention have been shown and described, it is not intended to be limited thereby but only by the scope of the appended claims.

I claim:

1. In an electric arc melting furnace, the combination comprising a stationary mold of elongated generally rectangular horizontal cross section, three electrodes aligned in a row in the elongated direction of the mold and disposed within the mold in horizontal spaced relationship to one another and to the sidewalls in the mold, means for suspending the electrodes vertically in the mold with the free lower ends thereof being aligned horizontally, circuit means for supplying a three-phase alternating current to the electrodes operable to consume the electrodes progressively upward from the lower ends so that a molten pool collects in the mold beneath the lower ends of the electrodes, a slag blanket covering the molten pool and the lower free ends of the electrodes, means for advancing the electrodes toward the lower ends thereof to maintain the free ends in generally horizontal alignment to one another and elevated slightly above the pool, and the cross sectional area of the center electrode being larger than either of the other end electrodes.

2. In an electric furnace according to claim 1, the combination further including having the cross sectional area of the end electrodes equal to one another and each being approximately one half the cross sectional area of the center electrode.

References Cited

UNITED STATES PATENTS

| | | | |
|---|---|---|---|
| 757,617 | 4/1904 | Horry | 13—9 |
| 1,092,764 | 4/1914 | Buckman | 13—18 |
| 2,191,479 | 2/1940 | Hopkins | 164—252 X |
| 2,437,782 | 3/1948 | Hopkins | 164—52 |
| 2,525,133 | 10/1950 | Hopkins | 164—52 |
| 2,640,860 | 6/1953 | Herres | 164—252 X |
| 2,741,553 | 4/1956 | Dettmer et al. | 75—10 |
| 2,801,156 | 7/1957 | Udy | 13—9 |
| 2,908,736 | 10/1959 | Ernest | 13—13 |

J. SPENCER OVERHOLSER, *Primary Examiner.*

V. K. RISING, *Assistant Examiner.*